United States Patent
Lurie et al.

(10) Patent No.: US 11,144,547 B2
(45) Date of Patent: *Oct. 12, 2021

(54) CASE STATEMENT OPTIMIZATION

(71) Applicant: International Business Machines Corporation, Armonk, NY (US)

(72) Inventors: Andrei F. Lurie, San Jose, CA (US); Terence P. Purcell, Springfield, IL (US); Martina Simova, San Jose, CA (US); Jonathan Sloan, Manalapan, NJ (US)

(73) Assignee: International Business Machines Corporation, Armonk, NY (US)

( * ) Notice: Subject to any disclaimer, the term of this patent is extended or adjusted under 35 U.S.C. 154(b) by 251 days.

This patent is subject to a terminal disclaimer.

(21) Appl. No.: 16/422,186

(22) Filed: May 24, 2019

(65) Prior Publication Data

US 2019/0278772 A1    Sep. 12, 2019

Related U.S. Application Data

(63) Continuation of application No. 15/370,593, filed on Dec. 6, 2016, now Pat. No. 10,394,812.

(51) Int. Cl.
*G06F 16/2453* (2019.01)
*G06F 16/22* (2019.01)

(52) U.S. Cl.
CPC .... *G06F 16/24539* (2019.01); *G06F 16/2255* (2019.01); *G06F 16/24542* (2019.01)

(58) Field of Classification Search
CPC .............. G06F 16/22; G06F 16/24537; G06F 16/24542; G06F 16/24544
See application file for complete search history.

(56) References Cited

U.S. PATENT DOCUMENTS

| | | | |
|---|---|---|---|
| 5,339,420 | A | 8/1994 | Hoxey |
| 6,438,741 | B1 | 8/2002 | Al-omari |
| 2006/0106832 | A1 | 5/2006 | Ben-Dyke |
| 2008/0065590 | A1 | 3/2008 | Castro |
| 2008/0082474 | A1 | 4/2008 | Bangel et al. |
| 2009/0327254 | A1 | 12/2009 | Bruno |

(Continued)

FOREIGN PATENT DOCUMENTS

JP    03037726 A    2/1991

OTHER PUBLICATIONS

List of IBM Patents or Patent Applications Treated as Related, May 24, 2019, 2 pages.

*Primary Examiner* — Angelica Ruiz
(74) *Attorney, Agent, or Firm* — Steven Bouknight; Edell, Shapiro & Finnan, LLC

(57) ABSTRACT

A method, a computer program product and a system are provided. A case expression is analyzed for redundant expressions, patterns equivalent to a built-in function, and specific functions to form a simplified expression, wherein the case expression is written in a language supported by a database management system. The simplified expression is optimized based on a cost benefit evaluation of no optimization, native code generation, hashing inputs, and a results caching algorithm to form an execution plan. The execution plan is utilized in the database management system for the case expression.

14 Claims, 4 Drawing Sheets

(56) References Cited

U.S. PATENT DOCUMENTS

| | | | |
|---|---|---|---|
| 2012/0151184 A1* | 6/2012 | Wilkerson | G06F 9/468 |
| | | | 712/36 |
| 2012/0159459 A1 | 6/2012 | Turner | |
| 2014/0258266 A1 | 9/2014 | Cruanes | |
| 2018/0157707 A1 | 6/2018 | Lurie et al. | |

\* cited by examiner

CASE STATEMENT OPTIMIZATION

BACKGROUND

Present invention embodiments are related to systems, methods and computer program products for reducing an execution cost of complex case expressions in a database management system language statement.

With increasing use of real-time analytics, Extract, Transfer and Load (ETL) processes that use database management systems are being replaced with in-database transformations within database management system language statements such as, for example, SQL statements. One example of such an in-database transformation are complex CASE expressions coded in a SQL SELECT list to perform data transformations that were previously performed within an ETL process.

An ETL process introduces data latency. By moving the data transformations to a SQL statement, analytics can occur against real-time data. Thus, instead of executing a data transformation once, during ETL, and having queries execute on stale data, executing the data transformation in a SQL statement allows the data transformation to occur on real-time data. However, complex CASE expressions introduce increased execution cost for data transformations in SQL statements.

Due to limitations within a SQL statement regarding sharing of an expression (unless, for example, the expression is coded in a view or table expression and then referenced multiple times in a referencing SELECT statement), duplication of a complete CASE expression in a single SQL statement is not uncommon. Duplication of subsets of a CASE expression or inverse comparisons referenced in separate CASE expressions also are not uncommon. Further, CASE expressions created by SQL code generators also cause duplication.

SUMMARY

In a first aspect of the invention, a machine-implemented method is provided for performing optimization techniques of case expressions. At least one processing device analyzes a case expression for redundant expressions, patterns equivalent to a built-in function, and specific functions to form a simplified expression, wherein the case expression is written in a language supported by a database management system. The at least one processing device optimizes the simplified expression based on a cost benefit evaluation of no optimization, native code generation, hashing inputs, and a results caching algorithm to form an execution plan. The execution plan is utilized in the database management system for the case expression.

In a second aspect of the invention, a computer program product is provided which has at least one computer readable storage medium including computer readable program code embodied therewith for execution on at least one processing system. The computer-readable program code is configured to be executed by the at least one processing system to: analyze a case expression for redundant expressions, patterns equivalent to a built-in function, and specific functions to form a simplified expression, wherein the case expression is written in a language supported by a database management system; optimize, by the at least one processing system, the simplified expression based on a cost benefit evaluation of no optimization, native code generation, hashing inputs, and a results caching algorithm to form an execution plan; and utilize, by the at least one processing system, the execution plan in the database management system for the case expression.

In a third aspect of the invention, a system is provided for performing optimization techniques of case expressions. The system includes at least one processor and at least one memory connected to the at least one processor. The at least one memory includes instructions for the at least one processor to perform a method that includes: analyzing a case expression for redundant expressions, patterns equivalent to a built-in function, and specific functions to form a simplified expression, wherein the case expression is written in a language supported by a database management system; optimizing the simplified expression based on a cost benefit evaluation of no optimization, native code generation, hashing inputs, and a results caching algorithm to form an execution plan; and utilizing the execution plan in the database management system for the case expression.

BRIEF DESCRIPTION OF THE DRAWINGS

Generally, like reference numerals in the various figures are utilized to designate like components.

DETAILED DESCRIPTION

Various embodiments of the invention determine appropriate optimization techniques for complex CASE expressions in a database management system (DBMS) language statement. In a pre-optimization step, various embodiments determine whether a CASE statement can be simplified to another built-in DBMS function in order to avoid CASE statement overhead, or determine whether common or inverse comparisons can be factored out of a CASE statement in order to avoid redundant execution and share results. Functions may also be factored out of CASE statements in order to improve generated/compiled code performance.

A simplified CASE statement from the pre-optimization step may be evaluated to determine whether runtime code generation, caching, or a combination of runtime code generation and caching is to be utilized. When inputs to the CASE statement can be consolidated to ensure that duplicates are processed consecutively, lightweight caching may be performed. When the CASE statement cannot benefit from consolidated input, a heavyweight caching solution may be performed, which may include but not be limited to hashing.

Embodiments ensure that an access path selection is aware of advantages of consolidating inputs to reduce CASE statement overhead and take this into consideration when evaluating sorts or hashing.

Figure 1:
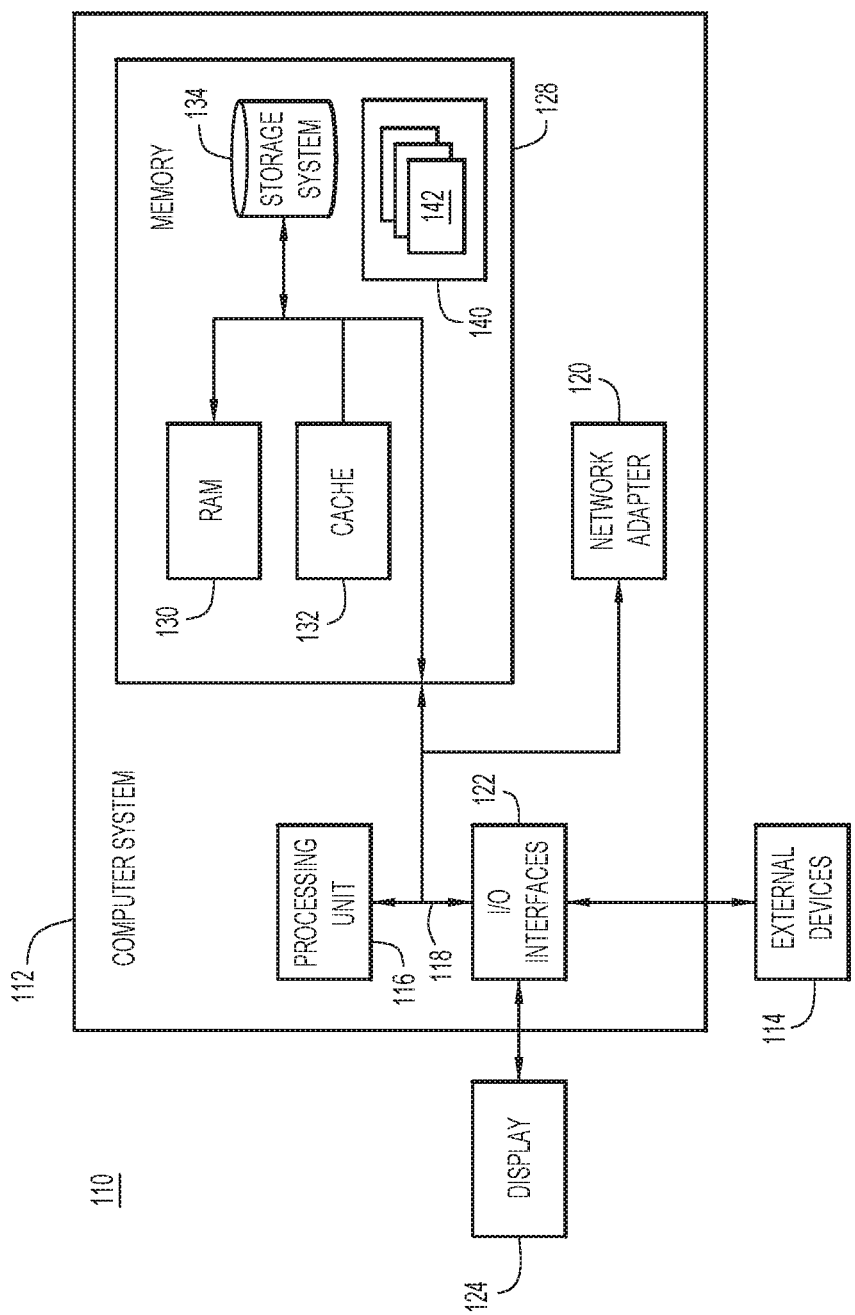
FIG. 1 illustrates an example processing device that may be used to implement embodiments of the invention.

An example processing device 110 in which embodiment of the invention may be implemented is shown in FIG. 1. In some embodiments, multiple processing devices connected with each other via a network may implement embodiments of the invention. As shown in FIG. 1, computer system 112 is shown in the form of a general-purpose computing device. Components of computer system 112 may include, but are not limited to, one or more processors or processing units 116, a system memory 128, and a bus 118 that couples various system components including system memory 128 to one or more processors 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 112 typically includes a variety of computer system readable media. Such media may be any available media that is accessible by computer system 112, and includes both volatile and non-volatile media, removable and non-removable media.

System memory 128 can include computer system readable media in the form of volatile memory, such as random access memory (RAM) 130 and/or cache memory 132. Computer system 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, the one or more application programs, the other program modules, and the program data or some combination thereof, may include an implementation of a networking environment. Program modules 142 generally carry out the functions and/or methodologies of embodiments of the invention as described herein.

Computer system 112 may also communicate with one or more external devices 114 such as a keyboard, a pointing device, a display 124, etc.; one or more devices that enable a user to interact with computer system 112; and/or any devices (e.g., network card, modem, etc.) that enable computer system 112 to communicate with one or more other computing devices. Such communication can occur via Input/Output (I/O) interfaces 122. Still yet, computer system 112 can communicate with one or more networks such as a local area network (LAN), a general wide area network (WAN), and/or a public network (e.g., the Internet) via network adapter 120. As depicted, network adapter 120 communicates with the other components of computer system 112 via bus 118. It should be understood that, although not shown, other hardware and/or software components could be used in conjunction with computer system 112. Examples, include, but are not limited to: microcode, device drivers, redundant processing units, external disk drive arrays, RAID systems, tape drives, and data archival storage systems, etc.

Figure 2:
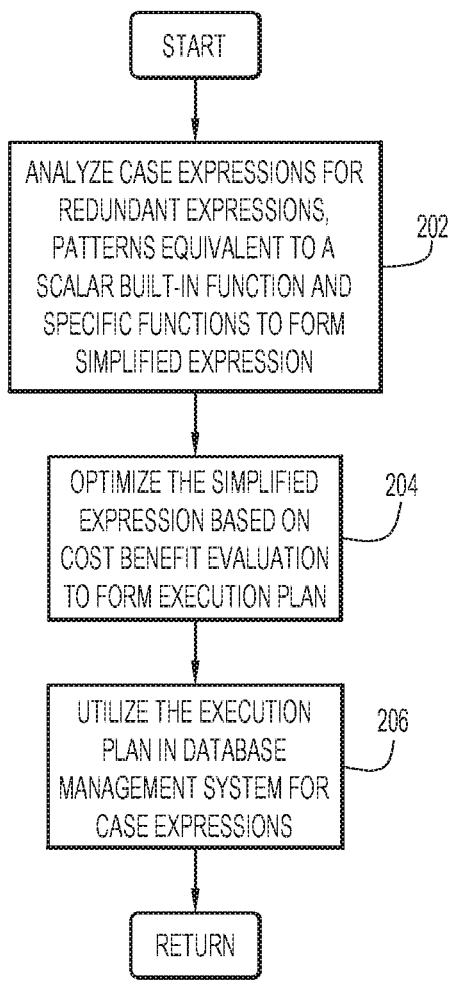
FIG. 2 is a flowchart that illustrates an example process that may be performed in embodiments of the invention.

FIG. 2 illustrates a flowchart of an example process that may be performed by one or more processing devices 110 in various embodiments. First, a pre-optimization step may be performed to analyze case expressions for redundant expressions, patterns equivalent to a scalar built-in function and specific functions to form a simplified CASE expression (act 202).

Figure 3:
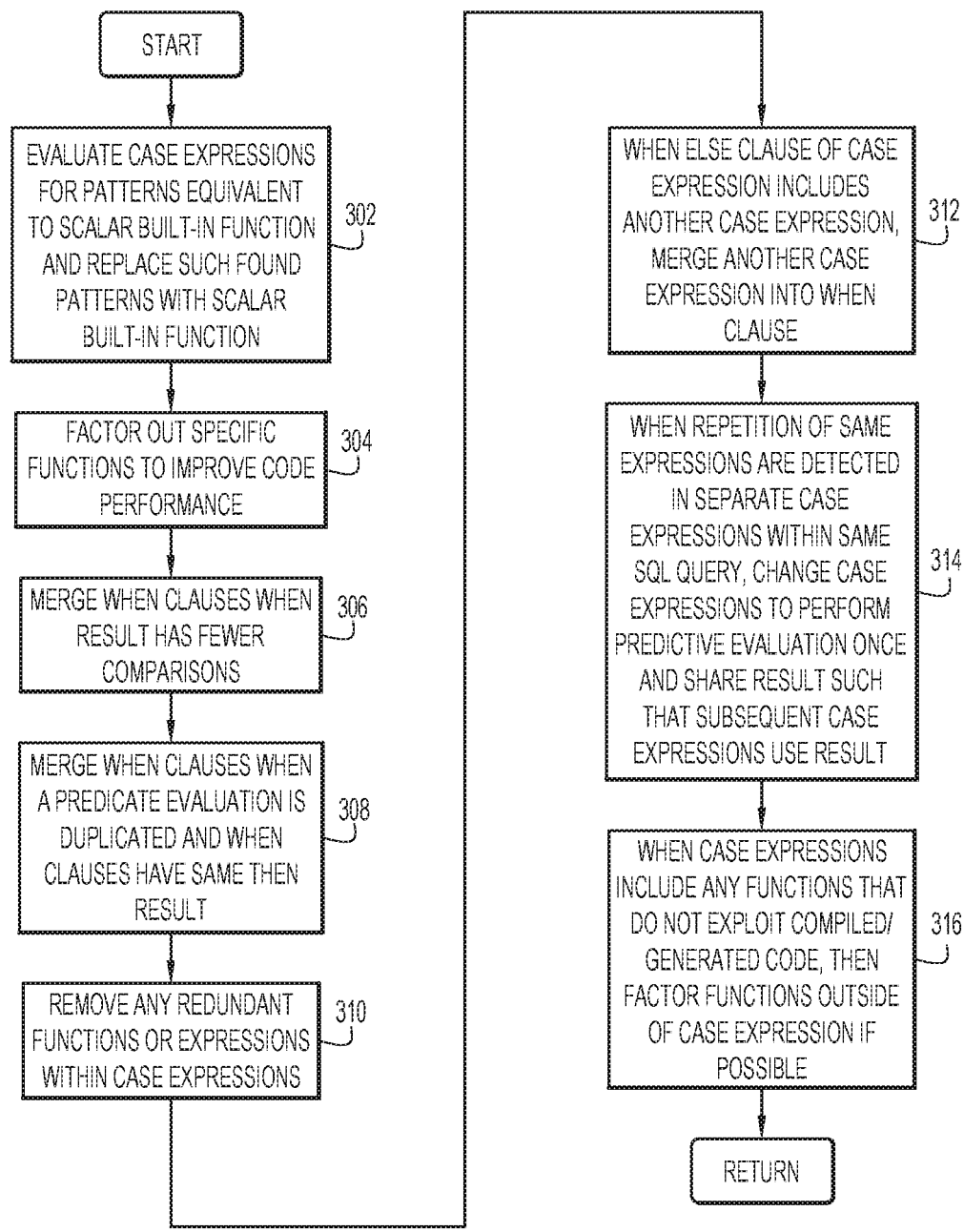
FIG. 3 is a flowchart that illustrates, in detail, example processing that may be performed with respect to act 202 of the flowchart of FIG. 2.

FIG. 3 is a flowchart illustrating processing of act 202 in more detail. First, one or more processing devices 110 may evaluate CASE expressions for patterns equivalent to scalar built-in functions and, if found, may replace the pattern(s) with equivalent scalar built-in function(s) (act 302). For example, consider:

---
CASE WHEN C1 IS NULL
THEN C2
ELSE C1 END
---

The above CASE statement replaces a value from column 1 with a value from column 2 when the value from column 1 is null. Otherwise, the value of column 1 remains a same value. The above CASE statement can be replaced with a COALESCE (or VALUE) scalar function because the above CASE statement merely replaces a null value with a value from an alternate column:

COALESCE (C1, C2)

Similarly, the following CASE statement:

---
CASE WHEN C1 IS NOT NULL
THEN C1
ELSE C2 END
--- may be replaced with:

COALESCE (C1, C2)

If the column (C1) is already defined as NOT NULL, then the pre-optimization step would eliminate the CASE (or COALESCE) because of redundancy.

In general, CASE statements can benefit from runtime generated, or compiled, code. If a CASE statement contains scalar functions, then for optimal performance the scalar functions should be compiled code. Otherwise, there is a performance cost regarding entering and exiting machine code.

Due to development resource requirements, generating code for all supported DBMS functions may be impractical. As a result, the pre-optimization step may factor out of CASE expressions any functions that do not exploit compiled/generated code. In some embodiments, this may be implemented by maintaining a table of all functions that support compiled/generated code. The pre-optimization step may then only factor out functions from a CASE statement that are not included in the table (act 304).

The following example illustrates a scalar function, SUBSTR, in a WHEN clause:

---
CASE WHEN SUBSTR (C1, 4, 1) IN ('F', 'G') THEN C2
ELSE C3 END
---

According to the above statement, when a character in a fourth position of a character string value of column 1 is either 'F' or 'G-', then the character is changed to a value of column 2. Otherwise, the character is changed to a value of column 3. Assuming that the SUBSTR function does not currently exploit compiled code, then SUBSTR (C1, 4, 1) may be factored out of the WHEN clause and executed before the CASE statement. A result of SUBSTR (C1, 4, 1) may be passed as input to the CASE statement.

The pre-optimization step may then determine which parts of a CASE statement can be merged or removed. WHEN clauses can be merged when a result of the merge has fewer comparisons (act 306). For example, consider:

```
CASE C1
    WHEN 'S' THEN C2
    WHEN 'H' THEN 0
    ELSE 0 END
```

The second WHEN clause and the ELSE clause share a same result, zero. Therefore, the second WHEN clause is redundant and can be removed resulting in:

```
CASE C1
    WHEN 'S' THEN C2
    ELSE 0 END
```

Next, when the pre-optimization step determines that a predicate evaluation is duplicated and corresponding WHEN clauses have a same result, WHEN clauses may be merged and a predicate operator replaced with IN (act 308). As an example, consider the following:

```
CASE WHEN SUBSTR (C1, 4, 1) = 'F' THEN C2
    WHEN SUBSTR (C1, 4, 1) = 'G' THEN C2
    ELSE C3 END
```

The two WHEN clauses can be merged and the predicate operator replaced with IN as follows:

```
CASE WHEN SUBSTR (C1, 4, 1) IN ('F', 'G') THEN C2
    ELSE C3 END
```

The IN predicate operator indicates that what follows is a list of values.

The pre-optimization step may then remove any redundant functions or expressions within CASE expressions (act 310). For example, consider:

```
CASE WHEN COALESCE (C1, 0) > 0
    THEN 1 ELSE 0 END
```

In this example, the COALESCE function is redundant because it merely replaces a NULL value with a zero and then performs a comparison to determine whether a result of the COALESCE function is greater than zero. Without the COALESCE function, if C1 has a value of NULL then C1>0 would not be true and would qualify against the ELSE clause. Therefore, the redundant COALESCE function can be removed resulting in:

```
CASE WHEN C1 > 0
    THEN 1 ELSE 0 END
```

In another example, consider:

```
CASE WHEN C1 = 0 THEN 0
    ELSE C2/NULLIF (C1, 0) END
```

NULLIF is added to a divisor to avoid a "divide by zero error". However, the preceding WHEN clause already excluded zero results from entering the equation. Some query generators automatically add NULLIF to avoid division by zero. In the above example, the NULLIF may be removed resulting in:

```
CASE WHEN C1 = 0 THEN 0
    ELSE C2/C1 END
```

A third example demonstrates a redundant datatype function call. Consider:

```
CASE WHEN C1 = 0 THEN INTEGER (INTCOL2)
    ELSE INTEGER (INTCOL3) END
```

In this example, INTCOL1 AND INTCOL2 are defined as integer values. INTEGER is a scalar function for setting a value to an integer datatype. However, when a scalar function is used to set a column or literal to a same datatype as its original definition for default, then the scalar function may be removed resulting in:

```
CASE WHEN C1 = 0 THEN INTCOL2
    ELSE INTCOL3 END
```

Returning to FIG. 3, the pre-optimization step may then determine whether an ELSE clause of a CASE expression includes another CASE expression. If so, then the other CASE expression may be merged into the WHEN clause (act 312). As an example, the following has a new CASE expression following an ELSE condition.

```
CASE WHEN T1.DELDATE > '0001-01-01' THEN T1.DELDATE
    ELSE (CASE WHEN T2.DELDATE > '0001-01-01' THEN
    T2.DELDATE
        ELSE T3.DELDATE END) END AS DELDATE
```

Because each CASE expression may be treated as a new execution to the DBMS' CASE routine, the coding above is suboptimal. The above CASE expression can be simplified by merging the additional CASE expression(s) into a WHEN clause as follows:

```
CASE WHEN T1.DELDATE > '0001-01-01' THEN T1.DELDATE
    WHEN T2.DELDATE > '0001-01-01' THEN T2.DELDATE
    ELSE T3.DELDATE END) END AS DELDATE
```

Returning to FIG. 3, during the pre-optimization step, when repetition of a same expression is detected in separate CASE expressions within a same query, including but not limited to a SQL query, the CASE expressions may be changed to perform a predicate evaluation once and share a result such that subsequent CASE expressions use the result (act 314). For example, consider the following example:

```
SUM(CASE WHEN C3 BETWEEN 7 AND 9 THEN C4 END )
,SUM(CASE WHEN C3 BETWEEN 7 AND 9 THEN C5 END )
,SUM(CASE WHEN C3 BETWEEN 7 AND 9 THEN NULL ELSE
C6 END )
,SUM(CASE WHEN C3 BETWEEN 7 AND 9 THEN NULL ELSE
C7 END )
```

For this example, the pre-optimization step may change the above expressions such that the WHEN clause predicate evaluation is executed once. A corresponding result is shared such that after the C3 predicate is evaluated for the first CASE statement, the subsequent CASE statements will use the result to execute either the THEN expression or the ELSE expression based on the result of the first CASE statement. A result of the pre-optimization step may be:

```
CASE WHEN C3 BETWEEN 7 AND 9 THEN TRUE
    ELSE FALSE END AS C3BOOLEAN
SUM (CASE WHEN C3BOOLEAN = TRUE THEN C4 END)
, SUM (CASE WHEN C3BOOLEAN = TRUE THEN C5 END)
, SUM (CASE WHEN C3BOOLEAN = TRUE THEN NULL ELSE C6
END)
, SUM (CASE WHEN C3BOOLEAN = TRUE THEN NULL ELSE C7
END)
```

Returning to FIG. 3, when CASE expressions include functions that do not exploit compiled/generated code, the pre-optimization step may factor out such functions from the CASE expressions in order to avoid overhead caused by entering and exiting machine code (act 316). In some embodiments, a table of functions that support compiled/generated code may be maintained. If a function is not included in the table of functions, the pre-optimization step may factor the function out of CASE expressions. Consider the following example:

```
CASE WHEN SUBSTR (C1, 4, 1) IN ('F', 'G') THEN C2
    ELSE C3 END
```

Assuming that a function, SUBSTR, does not exploit compiled code, then the above case expression may be changed by the pre-optimization step to:

```
CHARVALUE = SUBSTR (C1, 4, 1)
CASE WHEN CHARVALUE IN ('F', 'G') THEN C2
    ELSE C3 END
```

Returning to FIG. 2, the simplified expression formed during act 202 may be optimized based on a cost-benefit evaluation in order to form an execution plan (act 204).

Figure 4:
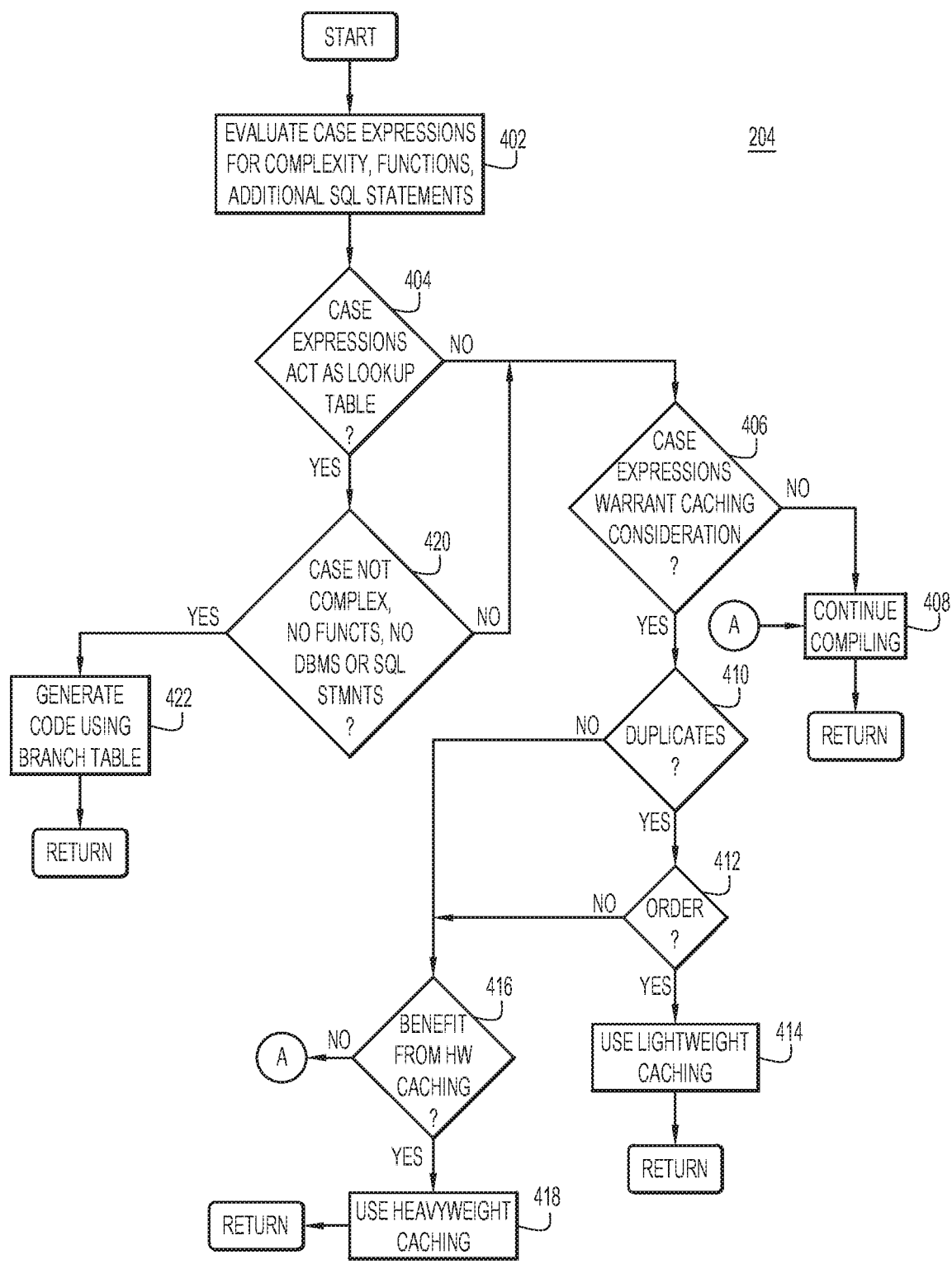
FIG. 4 is a flowchart that illustrates, in detail, example processing that may be performed with respect to act 204 of the flowchart of FIG. 2.

FIG. 4 is a flowchart showing the example process of act 204 in more detail. The process may begin by evaluating case expressions for complexity, functions, and additional SQL statements (act 402). Next, a determination may be made regarding whether the evaluated case expressions act as a lookup table (act 404). If the evaluated case expressions act as a lookup table, then a determination is made regarding whether the case expressions are not complex, have no functions and no SQL statements (act 420). If, during act 420, the case expressions are determined not to be complex, have no functions and no SQL statements, then code may be generated using a branch table (act 422).

For example, consider the following case expressions for converting a state abbreviation to its full state title.

```
CASE STATE_CD WHEN 'AL' THEN 'ALABAMA'
    WHEN 'AK' THEN 'ALASKA'
    WHEN 'AR' THEN 'ARKANSAS'
    WHEN 'AZ' THEN 'ARIZONA'
    WHEN 'CA' THEN 'CALIFORNIA'
    WHEN 'CO' THEN 'COLORADO'
    WHEN 'CT' THEN 'CONNECTICUT'
    .....
    WHEN 'WY' THEN 'WYOMING'
```

Given that the above example does not perform any complex expressions, functions or additional DBMS or SQL statements, an appropriate solution would be exploiting generated (compiled) code using a branch table. This solution would outperform any heavyweight caching solution that builds a hash table. This example demonstrates that simple CASE statements are unlikely to be candidates for heavyweight caching, although lightweight caching may still be viable.

Returning to FIG. 4, if, during act 404, the CASE expressions are determined not to act as a lookup table, or if, during act 420, the CASE expressions are determined to be complex, have functions, or include DBMS or SQL statements, then a determination may be made regarding whether the CASE expressions warrant caching consideration (act 406). For example, as the complexity of the CASE expressions increase, the generated code is going to be less effective. For example, CASE statements that contain scalar functions that cannot be factored out, based upon results of the pre-optimization phase, are considered to be complex enough to consider caching. Other examples of complex CASE statements that are not generated/compiled code candidates include CASE statements containing a scalar correlated subselect in a WHEN clause.

For example, consider the following.

```
SUM (CASE WHEN (SELECT COUNT (*)
    FROM T2 JOIN T3
    ON T2.ID=T3.ID
    WHERE T2.ID=T1.ID)) > 0 THEN 1 ELSE 0 END)
```

Because the above CASE statement contains execution of a SQL statement, and any overhead associated with building a hash and hash lookup will be less than a subselect execution, assuming duplicate inputs, this example should be considered to benefit from a caching solution. In the above example, the correlation predicate is T1.ID from an outer query (not shown in this example). If there are duplicates on the T1.ID column, then an opportunity to cache will depend on cardinality of the column, and any opportunity to exploit ordered access to the CASE statement will depend on a chosen access path. Examples of where the access path may choose to provide order or hashing by a given column may include:

Sort of an outer table for a nested loop, hybrid or sort-merge/merge-scan joins
  Index order (or approximate order by data clustering)
  Hashing as input to a GROUP BY or DISTINCT sort The access path selection can recognize which columns provide order. If those columns are input to the CASE statement, then lightweight caching (involving saving a last n values) will be effective to minimize the case statement execution.

If order is not provided as input to the CASE statement, then the cardinality of the inputs will dictate whether heavyweight caching would benefit. Cache sizes greater than 32,000 entries, likely, begin to diminish in value as the cardinality increases.

Returning to FIG. 4, if during act 406 CASE expressions are determined not to warrant caching consideration, then compiling may continue (act 408) and the compiled/generated code is included in the execution plan. Otherwise, column cardinality may be evaluated to determine a presence of duplicates (act 410). If the presence of duplicates is determined, and the access path selection recognizes that columns that provide order are input to the CASE (act 412), then lightweight caching may be performed (act 414) and included in the execution plan.

If, during act 410, the presence of duplicates is not determined, or during act 412 the columns that are input to the CASE do not provide order, then a determination may be made regarding whether the CASE would benefit from heavyweight caching (act 416). Heavyweight caching involves storing inputs/output into a hash table, where the inputs are used to build the hash. Various embodiments evaluate an appropriate optimization given CASE statement complexity—including a degree that generated/compiled code is applicable, whether the inputs are duplicated, and whether the inputs are ordered to benefit from lightweight caching, or whether the complexity and cardinality of inputs warrants heavyweight caching. When evaluating whether the CASE would benefit from heavyweight caching, overhead for building a hash must be considered.

If, during act 416, a determination is made that the CASE would benefit from the heavyweight caching, then the heavyweight caching is included in the execution plan for the CASE and code for generating a hash will be generated (act 418). If, during act 416 the determination is made that the CASE would not benefit from heavyweight caching, then compiling continues (act 408) and the compiled/generated code is included in the execution plan.

Returning to FIG. 2, the execution plan, created by acts 202 and 204, is utilized in the database management system for the CASE expressions.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim as our invention:

1. A machine-implemented method for performing optimization techniques of case expressions, the machine-implemented method comprising:
   analyzing, by at least one processing device, a case expression for redundant expressions, patterns equivalent to a built-in function, and specific functions to form a simplified expression, wherein the case expression is written in a language supported by a database management system;
   optimizing, by the at least one processing device, the simplified expression based on a cost benefit evaluation of no optimization, native code generation, hashing inputs, and a results caching algorithm to form an execution plan, the optimizing further comprising:
      evaluating the case expression to determine whether the case expression would benefit from caching or code generation,
      determining whether the case expression would benefit more from lightweight caching or heavyweight caching when the evaluating determines that the case expression would benefit from the caching, and
      incorporating the lightweight caching in the execution plan when inputs to the case expression are determined to be ordered inputs, the lightweight caching saving a last n inputs and results in a cache, where n is a positive integer; and
   utilizing, by the at least one processing device, the execution plan in the database management system for the case expression.

2. The machine-implemented method of claim 1, wherein the analyzing of the case expression further comprises:
   merging first parts of the case expression based on the analyzing; and
   removing second parts from the case expression based on the analyzing.

3. The machine-implemented method of claim 2, wherein the analyzing of the case expression further comprises
   replacing the patterns equivalent to the built-in function with the built-in function.

4. The machine-implemented method of claim 1, wherein the analyzing of the case expression further comprises:
   identifying the specific functions that can be factored out of the case expression; and
   factoring the identified specific functions out of the case expression.

5. The machine-implemented method of claim 1, wherein the optimizing further comprises:
   incorporating heavyweight caching in the execution plan when the case expression is determined to benefit more from the heavyweight caching than the lightweight caching, the heavyweight caching further comprising:
      storing inputs to the case expression and associated results in a hash table.

6. A computer program product comprising:
   at least one computer readable storage medium having computer readable program code embodied therewith for execution on at least one processing system, the computer readable program code being configured to be executed by the at least one processing system to:
      analyze a case expression for redundant expressions, patterns equivalent to a built-in function and specific functions to form a simplified expression, wherein the case expression is written in a language supported by a database management system;
      optimize the simplified expression based on a cost benefit evaluation of no optimization, native code generation, hashing inputs, and a results caching algorithm to form an execution plan, the optimizing further comprising
         evaluating the case expression to determine whether the case expression would benefit from caching or code generation,
         determining whether the case expression would benefit more from lightweight caching or heavyweight caching when the evaluating determines that the case expression would benefit from the caching, and
         incorporating the heavyweight caching in the execution plan when the case expression is determined to benefit more from the heavyweight caching than the lightweight caching, the heavyweight caching further comprising:
            storing inputs to the case expression and associated results in a hash table; and
      utilize the execution plan in the database management system for the case expression.

7. The computer program product of claim 6, wherein the analyzing of the case expression further comprises:
   merging first parts of the case expression based on the analyzing; and
   removing second parts from the case expression based on the analyzing.

8. The computer program product of claim 7, wherein the analyzing of the case expression further comprises:
   replacing the patterns equivalent to the built-in function with the built-in function.

9. The computer program product of claim 6, wherein the analyzing of the case expression further comprises:
   identifying the specific functions that can be factored out of the case expression; and
   factoring the identified specific functions out of the case expression.

10. The computer program product of claim 6, wherein the optimizing further comprises:
    incorporating the lightweight caching in the execution plan when the input to the case expression is determined to be ordered input, the lightweight caching saving a last n inputs and results in a cache, where n is a positive integer.

11. A system for performing optimization techniques of case expressions, the system comprising:
    at least one processor; and at least one memory connected to the at least one processor, the at least one memory including instructions for the at least one processor to perform a method comprising:
  analyzing a case expression for redundant expressions, patterns equivalent to a built-in function and specific functions to form a simplified expression, wherein the case expression is written in a language supported by a database management system;
  optimizing the simplified expression based on a cost benefit evaluation of no optimization, native code generation, hashing inputs, and a results caching algorithm to form an execution plan, the optimizing further comprising:
    evaluating the case expression to determine whether the case expression would benefit from caching or code generation,
    determining whether the case expression would benefit more from lightweight caching or heavyweight caching when the evaluating determines that the case expression would benefit from the caching, and
    incorporating the lightweight caching in the execution plan when inputs to the case expression are determined to be ordered inputs, the lightweight caching saving a last n inputs and results in a cache, where n is a positive integer; and
  utilizing the execution plan in the database management system for the case expression.

12. The system of claim 11, wherein the analyzing of the case expression further comprises:
  merging first parts of the case expression based on the analyzing; and
  removing second parts from the case expression based on the analyzing.

13. The system of claim 12, wherein the analyzing of the case expression further comprises
  replacing the patterns equivalent to the built-in function with the built-in function.

14. The system of claim 11, wherein the analyzing of the case expression further comprises:
  identifying the specific functions that can be factored out of the case expression; and
  factoring the identified specific functions out of the case expression.

* * * * *